(12) United States Patent
Guo

(10) Patent No.: US 8,083,516 B2
(45) Date of Patent: Dec. 27, 2011

(54) MOLD HAVING AIR-VENTING GROOVES

(75) Inventor: Ming-Lung Guo, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 39 days.

(21) Appl. No.: 12/841,984

(22) Filed: Jul. 22, 2010

(65) Prior Publication Data
US 2011/0256255 A1 Oct. 20, 2011

(30) Foreign Application Priority Data
Apr. 16, 2010 (TW) .............................. 99112091 A

(51) Int. Cl.
*B29C 45/34* (2006.01)
(52) U.S. Cl. ............... 425/572; 264/102; 264/328.8; 425/812

(58) Field of Classification Search .................. 425/420, 425/572, 812; 264/102, 328.8
See application file for complete search history.

(56) References Cited

U.S. PATENT DOCUMENTS 7,625,199 B2 * 12/2009 Jahn et al. ...................... 425/190
7,956,471 B2 * 6/2011 Eu et al. .......................... 257/774
* cited by examiner

*Primary Examiner* — Timothy Heitbrink
(74) *Attorney, Agent, or Firm* — Altis Law Group, Inc.

(57) ABSTRACT

A mold includes a parting surface, runners, mold cavities, gates and primary air-venting grooves defined in the parting surface. The gates connect the respective runners to the corresponding mold cavities. Each primary air-venting groove includes an air-receiving groove portion and an air-venting groove portion in communication with the air-receiving groove portion. The air-receiving groove portion communicates with the gate and surrounds the corresponding mold cavity. The air-venting groove portion extends to and terminates at a corresponding edge of the parting surface.

7 Claims, 3 Drawing Sheets

MOLD HAVING AIR-VENTING GROOVES

BACKGROUND

1. Technical Field

The present disclosure relates to molds having air-venting grooves.

2. Description of Related Art

Generally, in an injection molding process, a mold is used. The mold defines a plurality of runners and a plurality of mold cavities communicating with the runners to form a plurality of plastic articles. During the injection molding process, molten material fills the runners and the mold cavities and then is cooled to form the plastic articles. However, air may remain in the runners and the mold cavities in a typical mold, and may deteriorate the plastic articles.

Therefore, what is needed is a mold, which can overcome the limitations described.

DETAILED DESCRIPTION

Figure 1:
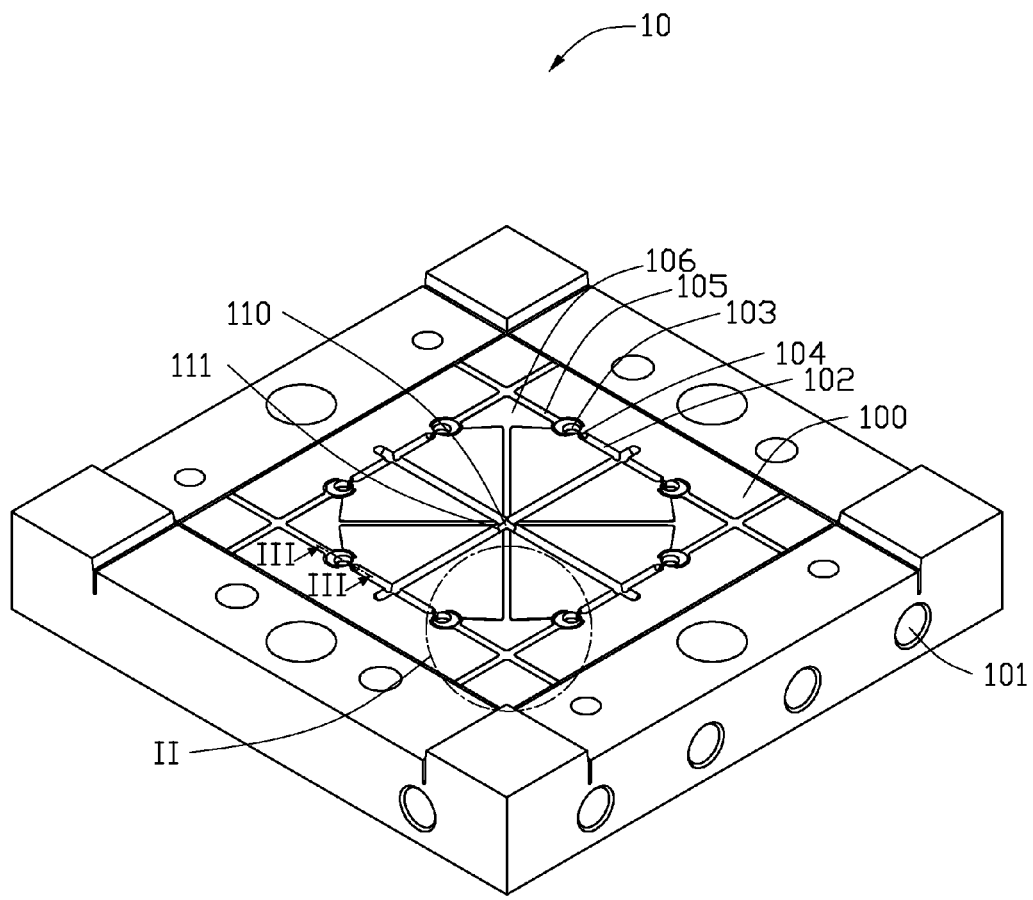
FIG. 1 is an isometric and schematic view of a mold, according to an exemplary embodiment.

Referring to FIG. 1, a mold 10, according to an exemplary embodiment, includes a parting surface 100, a sprue 110, and a plurality of cooling channels 101. Eight runners 102, eight mold cavities 103, eight gates 104, eight primary air-venting grooves 105 and four secondary air-venting grooves 106 are defined in the parting surface 100.

The cooling channel 101 is configured for introducing a coolant, such as water or oil to cool the mold 10. The sprue 110 is in communication with the runners 102 and a joint 111 is formed at a joining portion between the sprue 110 and the runner 102. The gate 104 connects the runner 102 and the mold cavity 103.

Figure 2:
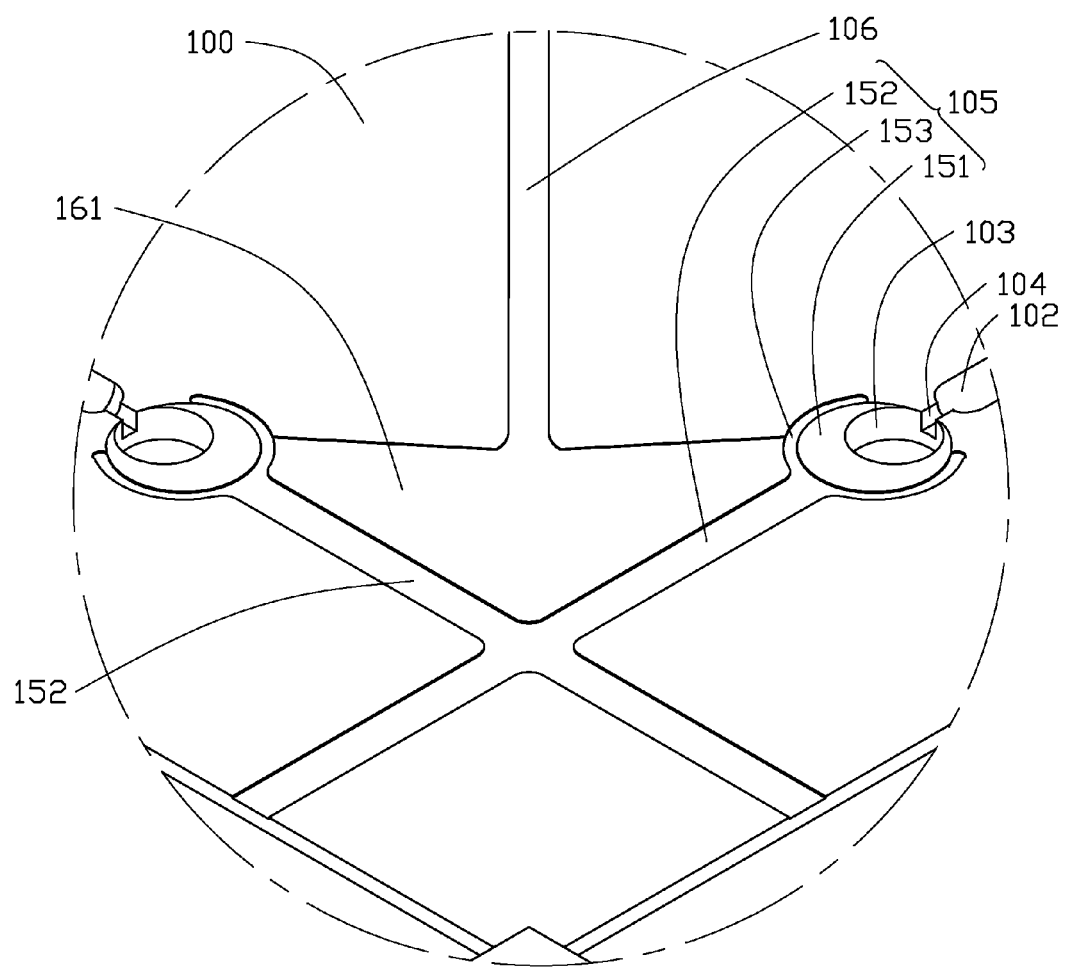
FIG. 2 is an enlarged view of a circled part II of the mold of FIG. 1.

Further referring to FIG. 2, the primary air-venting groove 105 includes an air-receiving groove portion 151, an air-venting groove portion 152, and an outer air-venting groove portion 153.

The air-receiving groove portion 151 is in communication with the air-venting groove portion 152 and the outer air-venting groove portion 153. The air-receiving groove portion 151 communicates with the gate 104 and surrounds the corresponding mold cavity 103. In this embodiment, the air-receiving groove portion 151 and the mold cavity 103 are substantially round, and the air-receiving groove portion 151 is internally tangent to the mold cavity 103. In this way, air from the mold cavity 103 can smoothly flow into the air-receiving groove portion 151. The gate 104 connects the mold cavity 103 at the tangent portion of the air-receiving groove portion 151 and the mold cavity 103.

Figure 3:
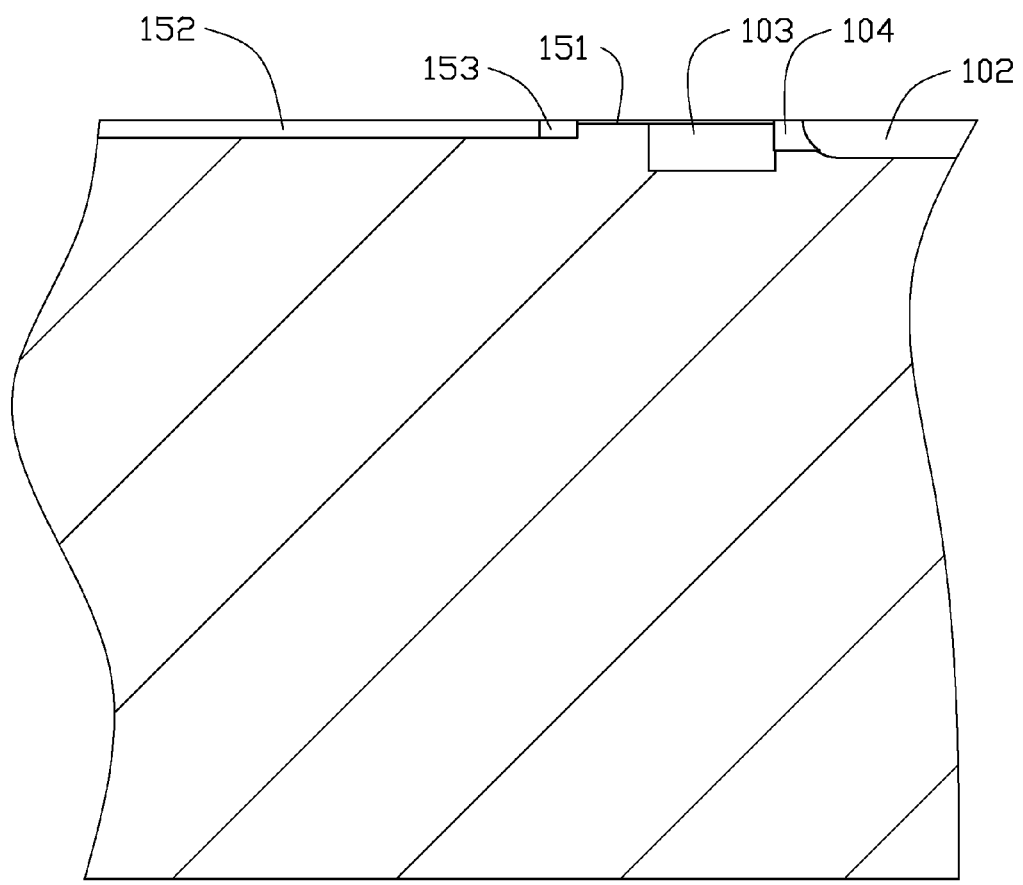
FIG. 3 is an enlarged sectional view taken in line III-III of the mold of FIG. 1.

The air-venting groove portion 152 connects the air-receiving groove portion 151 and the outer air-venting groove portion 153. The air-venting groove portion 152 extends to and terminates at a corresponding edge of the parting surface 100. In this embodiment, the air-venting groove portion 152 is substantially strip-shaped. The outer air-venting groove portion 153 partially surrounds the air-receiving groove portion 151 and connects the air-receiving groove portion 151 to the air-venting groove portion 152. A depth of the air-venting groove portion 152 is substantially equal to that of the outer air-venting groove portion 153 and is greater than that of the air-receiving groove portion 151, as shown in FIG. 3. In this embodiment, the depths of the air-venting groove portion 152 and the outer air-venting groove portion 153 are about 0.1 millimeters, and the depth of the air-receiving groove portion 151 is about 10 micrometers.

The secondary air-venting groove 106 connects the joint 111 to the air-venting groove portion 152. The secondary air-venting groove 106 is line-with-arrow-shaped. An arrow portion 161 of the secondary air-venting groove 106 interconnects two adjacent air-venting groove portions 152 so that air can be quickly repelled. A depth of the arrow portion 161 is the same as that of the air-receiving groove portion 151.

When in use, molten material (not shown) is injected in the mold 10 through the sprue 110 and flows into the runner 102 and the gate 104 in such order to fill into the mold cavity 103. During the above process, air in the mold 10 is repelled through a first channel of the secondary air-venting groove 106 to the air-venting groove portion 152 of the primary air-venting groove 105, and through a second channel of the runner 102, the gate 104, the mold cavity 103, the air-receiving groove portion 151, the air-venting groove portion 152 and the outer air-venting groove portion 153. The two channels increases air venting out of the mold 10. Thus, air in the mold 10 can be repelled completely and yield of plastic articles made by the mold 10 increases.

It is to be understood, however, that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A mold, comprising a parting surface, a plurality of runners, a plurality of mold cavities, a plurality of gates and a plurality of primary air-venting grooves defined in the parting surface, the gates connecting the respective runners to the corresponding mold cavities, each primary air-venting groove comprising an air-receiving groove portion and an air-venting groove portion in communication with the air-receiving groove portion, the air-receiving groove portion communicating with the gate and surrounding the corresponding mold cavity, the air-venting groove portion extending to and terminating at a corresponding edge of the parting surface.

2. The mold of claim 1, wherein each air-receiving groove portion is substantially round.

3. The mold of claim 1, wherein each air-venting groove portion is substantially strip-shaped.

4. The mold of claim 1, wherein each primary air-venting groove further comprises an outer air-venting groove portion, the outer air-venting groove portion partially surrounding the air-receiving groove portion and connecting the air-receiving groove portion to the air-venting groove portion.

5. The mold of claim 4, wherein a depth of the air-venting groove portion is substantially equal to that of the outer air-venting groove portion and is greater than a depth of the air-receiving groove portion.

6. The mold of claim 1, further comprising a sprue in communication with the runners, a joint being formed at a joining portion between the sprue and a corresponding runner, a plurality of secondary air-venting grooves defined in the parting surface, each secondary air-venting groove connecting the joint to the respective air-venting groove portion.

7. The mold of claim 6, wherein each secondary air-venting groove is line-with-arrow-shaped and comprises an arrow portion interconnecting two adjacent air-venting groove portions.

* * * * *